United States Patent
Lucey et al.

(10) Patent No.: US 10,677,089 B2
(45) Date of Patent: Jun. 9, 2020

(54) MITIGATION OF EFFECTS OF FAN BLADE OFF IN A GAS TURBINE ENGINE

(71) Applicant: ROLLS-ROYCE plc, London (GB)

(72) Inventors: Kieran P. Lucey, Derby (GB); Stephen J. Bendall, Derby (GB)

(73) Assignee: Rolls-Royce PLC, London (GB)

( * ) Notice: Subject to any disclaimer, the term of this patent is extended or adjusted under 35 U.S.C. 154(b) by 132 days.

(21) Appl. No.: 15/933,423

(22) Filed: Mar. 23, 2018

(65) Prior Publication Data

US 2018/0283206 A1  Oct. 4, 2018

(30) Foreign Application Priority Data

Mar. 29, 2017  (GB) .................................. 1704984.2

(51) Int. Cl.
  *F01D 21/04*  (2006.01)
  *F01D 5/02*  (2006.01)
  (Continued)

(52) U.S. Cl.
  CPC ........... *F01D 21/045* (2013.01); *F01D 5/026* (2013.01); *F01D 21/08* (2013.01); *F02C 7/06* (2013.01);
  (Continued)

(58) Field of Classification Search
  CPC ........ F01D 21/045; F01D 5/026; F01D 21/08; F01D 21/04; F02C 7/06; F04D 29/044;
  (Continued)

(56) References Cited

U.S. PATENT DOCUMENTS

| 6,224,321 B1 * | 5/2001 | Ebden ..................... F01D 5/048 415/174.4 |
| 2005/0172608 A1 | 8/2005 | Lapergue et al. |
| 2005/0241290 A1 * | 11/2005 | Lapergue ................ F01D 25/16 60/226.1 |

FOREIGN PATENT DOCUMENTS

| GB | 2494178 | 3/2013 | |
| GB | 2494178 A * | 3/2013 | ........... F04D 29/043 |
| GB | 2531162 | 4/2016 | |

OTHER PUBLICATIONS

Great Britain Search Report dated Sep. 12, 2017, issued in GB Patent Application No. 1704984.2.

* cited by examiner

*Primary Examiner* — Richard A Edgar
*Assistant Examiner* — Joshua R Beebe
(74) *Attorney, Agent, or Firm* — Simpson & Simpson, PLLC

(57) ABSTRACT

A fan is mounted on a fan shaft which constitutes part of a mainline shaft assembly centered for rotation on an engine axis X-X of a gas turbine engine. When in operation, the fan rotates about the engine axis X-X. A stub-shaft is arranged radially outwardly and concentrically with the fan shaft and adjoins an upstream facing face of a bearing sleeve. A fan catcher arm extends from the stub-shaft through the bearing sleeve and joins a fan catcher ring arranged downstream of the bearing sleeve and having an upstream facing face arranged to abut against a downstream facing face of the bearing sleeve in the event of a fan blade-off. Immediately downstream of the fan catcher ring is formed a shaft end which is configured to couple with an axially adjacent end of a low pressure compressor shaft. Immediately downstream of the bearing sleeve is a shaft end configured to connect with a turbine shaft.

10 Claims, 3 Drawing Sheets

(51) Int. Cl.
*F02C 7/06* (2006.01)
*F01D 21/08* (2006.01)
*F04D 29/053* (2006.01)
*F04D 29/044* (2006.01)

(52) U.S. Cl.
CPC .......... *F04D 29/053* (2013.01); *F04D 29/044* (2013.01); *F05D 2220/36* (2013.01); *F05D 2240/60* (2013.01); *F05D 2240/61* (2013.01)

(58) Field of Classification Search
CPC ............... F04D 29/053; F05D 2240/60; F05D 2240/61; F05D 2220/36
See application file for complete search history.

MITIGATION OF EFFECTS OF FAN BLADE OFF IN A GAS TURBINE ENGINE

CROSS-REFERENCE TO RELATED APPLICATIONS

This application is based upon and claims the benefit of priority from British Patent Application Number 1704984.2 filed 29 Mar. 2017, the entire contents of which are incorporated by reference.

FIELD OF DISCLOSURE

The present disclosure relates to mitigation of damage to a gas turbine engine following a fan blade-off event. More particularly, the disclosure provides improved radial load capability of structures supporting the fan which may serve to reduce the occurrence of component failure leading to engine damage downstream of the fan.

BACKGROUND

The fracture of fan blades during engine operation, sometimes termed "fan blade-off", is a significant safety concern. Such events may be caused by the collision of a foreign object into the fan. The very high relative velocity at which the fan blades and a foreign object collide can be sufficient to result in fracture of an impacted blade. In the event of such a fracture, fragments may be expelled at high velocity under centrifugal force potentially colliding with other components of the fan.

A consequence of loss of all or part of a fan blade is that the fan becomes unbalanced and its shaft tends to orbit an axis about which it is designed to rotate. This can result in a significantly increased radial load on downstream components such as a rotor of the compressor of the gas turbine engine. Excess radial loads can result in a mainline shaft failure, decoupling the turbine from the fan. In such circumstances the decoupled turbine has a tendency to overspeed, potentially leading to failure of a turbine disc.

In some engine designs, in the event of a mainline shaft failure rearwards movement of the rear section of the shaft can be limited due to a clash with the front bearing housing. In such designs, the bearing race can be connected to the mainline shaft assembly via a stub shaft. A fan catcher assembly is typically bolted to the stub shaft on an upstream facing side and to the bearing sleeve assembly on a downstream facing side. In the event of a fan-shaft failure or fan blade off event causing damage or failure to the fan-shaft, the fan-catcher assembly is intended to arrest any forward movement (i.e. in a downstream direction) of the fan-shaft by impacting on a downstream face of the bearing structure. The resulting reaction load is taken through the bearing to the upstream face of the bearing housing structure. As the axial load is applied to the fan catcher ring during a fan shaft failure, the clamp load on the fan catcher ring is reduced and this may allow slippage on the axial face between the stub shaft and the catcher ring. This prevents bending of the fan catcher arm which helps to restrict the axial deflection of the ring.

FIGS. 1 and 2 illustrate a known configuration of the fan end of a gas turbine engine. FIG. 2 illustrates a failure consequent on a fan blade-off event in the arrangement of FIG. 1.

In the arrangement of FIGS. 1 and 2 a fan 1 is mounted on a fan shaft 2 which constitutes part of a mainline shaft assembly centered for rotation on an engine axis X-X. When in operation, the fan rotates about the engine axis X-X. A stub-shaft 3 is arranged radially outwardly and concentrically with the fan shaft 2. A fan catcher arm 4 extends from the stub-shaft 3 through a bearing sleeve 5 and joins a fan catcher ring 6 arranged downstream of the bearing housing 5 and having an upstream facing face arranged to abut against a downstream facing face of the bearing housing 5 in the event of a fan blade-off. Immediately downstream of the fan catcher ring 6 is formed a shaft end 7 which is threaded to receive a nut (not shown) that holds the shaft onto the fan catcher ring 6. As can be seen the stub shaft 3 engages with the fan shaft 2 at a position 8 at an upstream end of the fan shaft 2. In contrast, the fan catcher arm 4 is radially distanced from the fan shaft 2 by a distance d which is typically of the order of 5-10 mm. Another shaft end 9 extends axially downstream from the bearing sleeve 5 and is threaded for a nut (not shown) to be attached that holds onto the bearing sleeve 5. The mainline shaft assembly constitutes the fan shaft 2 (which extends to become the compressor shaft) and a turbine shaft.

In the event of a fan blade-off event, unbalance in the fan results in the fan shaft 2 and surrounding fan catcher arm 4 tending to orbit the engine axis X-X rather than rotate on it. Thus when a critical radial load R is reached, the fan catcher arm 4 deflects and is thrown against the bearing sleeve 5 resulting in a fracture 10 of the fan catcher arm 4. Consequential damage can result to engine components downstream (not shown) with an associated risk of engine failure.

SUMMARY

In accordance with the present disclosure there is provided a gas turbine engine including a fan mounted for rotation on a fan shaft having an axis of rotation X-X, a stub shaft coaxially arranged with the fan shaft, radially facing surfaces of the stub shaft and fan shaft engaging each other at an end adjacent the fan, and a fan catcher assembly comprising one or more fan catcher arms extending from the stub shaft to a fan catcher ring located axially downstream of the fan. The stub-shaft connected to an upstream facing face of a bearing housing and the fan catcher ring having an upstream facing face opposing a downstream facing face of the bearing housing. The catcher arm and fan shaft extending through a central aperture of the bearing housing. In an extended region from a position upstream of an upstream facing face of the bearing housing to a position downstream of the upstream facing face of the bearing housing, a radial gap between the fan catcher arm and the fan shaft is consistently less than 5 mm.

The extended region may extend from the stub shaft. The extended region may terminate at a position which is closer to the upstream facing face of the bearing housing than downstream facing face of the bearing housing.

The radial gap is desirably minimised such that, in the event of unbalance in the fan, the fan shaft and fan catcher arm deflect together as if a single body. For example, the radial gap is 4 mm or less. The gap may be 3 mm or less, 2 mm or less or 1 mm or less.

Optionally, complementary contours are provided on opposed radially facing walls of the fan shaft and fan catcher arm in the extended region. Optionally, the thickness of the fan shaft in a radial dimension is increased in the extended region compared to outside of the extended region.

BRIEF DESCRIPTION OF THE DRAWINGS

Embodiments of the present disclosure will now be further described with reference to the accompanying Figures in which.

DETAILED DESCRIPTION

Figure 1:
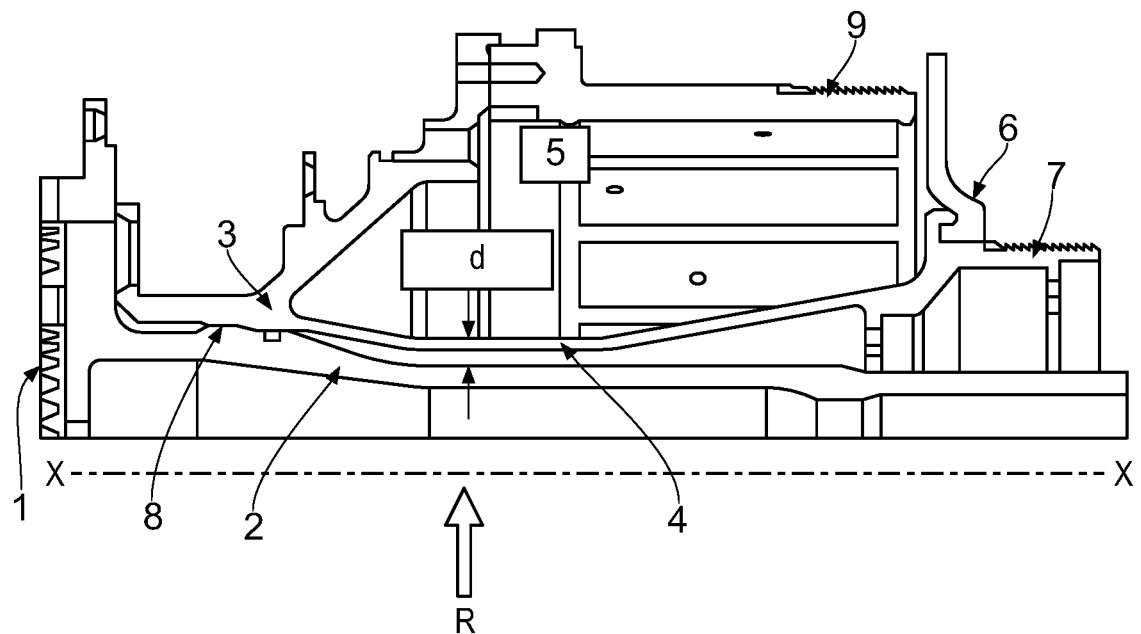
FIG. 1 shows a known configuration of the fan end of a turbofan gas turbine engine.
Figure 2:
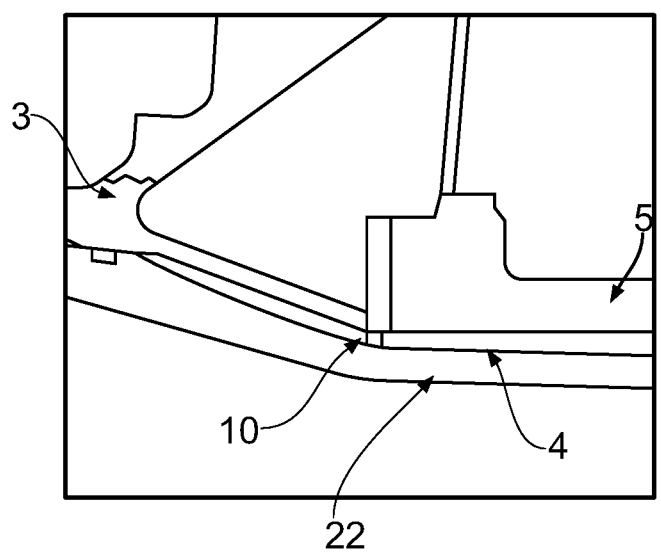
FIG. 2 shows the configuration of FIG. 1 after a fan blade-off event which has led to failure of the fan catcher assembly.

FIGS. 1 and 2 have been described above.

Figure 3:
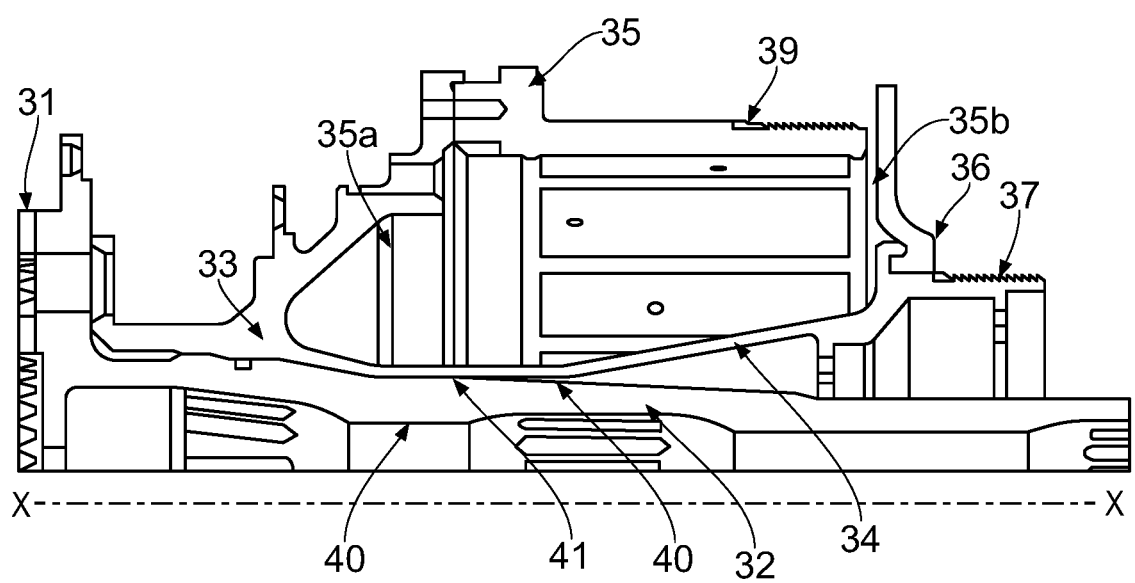
FIG. 3 shows an embodiment of fan and fan catcher arrangement suited to use in a gas turbine engine in accordance with the present disclosure.

In the arrangement of FIG. 3, a fan 31 is mounted on a fan shaft 32 which constitutes part of a mainline shaft assembly centered for rotation on an engine axis X-X. When in operation, the fan 31 rotates about the engine axis X-X. A stub-shaft 33 is arranged radially outwardly and concentrically with the fan shaft 32 and adjoins an upstream facing face of a bearing sleeve 35. A fan catcher arm 34 extends from the stub-shaft 33 through the bearing sleeve 35 and joins a fan catcher ring 36 arranged downstream of the bearing sleeve 35 and having an upstream facing face arranged to abut against a downstream facing face 35b of the bearing sleeve 35 in the event of a fan blade-off. Immediately downstream of the fan catcher ring 36 is formed a shaft end 37 which is threaded to receive a nut (not shown) that holds the shaft onto the fan catcher ring 36. Immediately downstream of the bearing sleeve 35 is threaded 39 for a nut (not shown) to be attached that holds onto the bearing sleeve 35. The mainline shaft assembly constitutes the fan shaft 32, compressor shaft and turbine shaft.

In contrast to the prior known arrangement of FIGS. 1 and 2, from the stub shaft 33 to a position 40 downstream of the upstream facing face 35a of the bearing sleeve 35 radially facing surfaces of the fan catcher arm 34 and fan shaft 32 are closely located over an extended region 41.

In the event of a fan blade-off event, unbalance in the fan results. Due to the close proximity of the fan shaft 32 and fan catcher arm 34 in the extended region 41, the two behave as one component which is considerably stiffer than the fan catcher arm 34 alone. Thus, the fan catcher arm is less prone to flexing and collision with the bearing sleeve 35 under radial loads comparable to radial load R in the arrangement of FIGS. 1 and 2. The risk of fracture of the fan catcher arm is significantly reduced. Risk of consequential damage to engine components downstream (not shown) is thus significantly reduced. Optionally, the stiffness of the fan shaft 32 in the extended region 41 is further increased by thickening 40 of the shaft in a radially inward direction.

Figure 4:
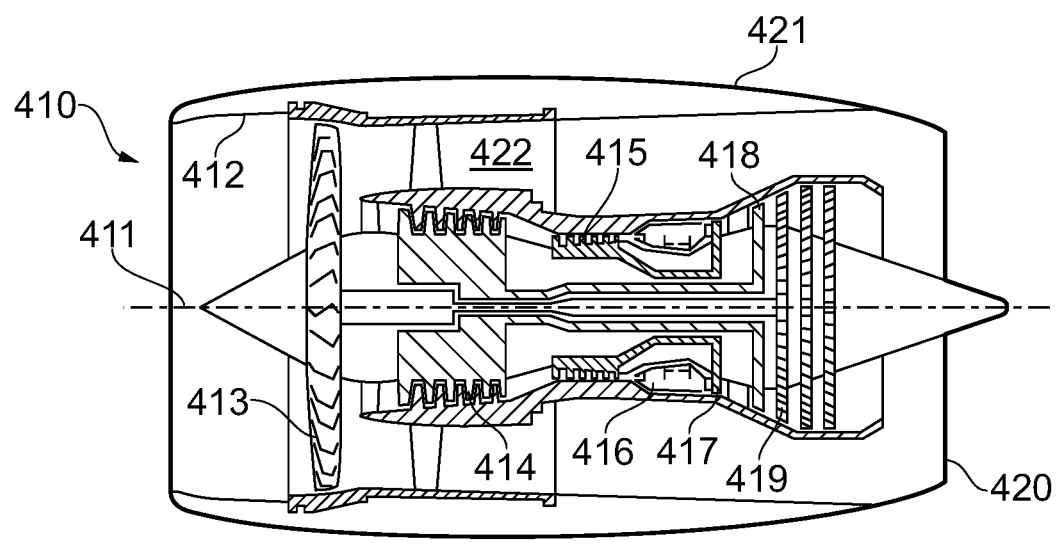
FIG. 4 is a sectional side view of a gas turbine engine.

FIG. 4 shows an example of gas turbine engine into which the described fan, stub shaft and fan catcher assembly may be employed.

With reference to FIG. 4, a gas turbine engine is generally indicated at 410, having a principal and rotational axis 411. The engine 410 comprises, in axial flow series, an air intake 412, a propulsive fan 413, an intermediate pressure compressor 414, a high-pressure compressor 415, combustion equipment 416, a high-pressure turbine 417, an intermediate pressure turbine 418, a low-pressure turbine 419 and an exhaust nozzle 420. A nacelle 421 generally surrounds the engine 410 and defines both the intake 412 and the exhaust nozzle 420.

The gas turbine engine 410 works in the conventional manner so that air entering the intake 412 is accelerated by the fan 413 to produce two air flows: a first air flow into the intermediate pressure compressor 414 and a second air flow which passes through a bypass duct 422 to provide propulsive thrust. The intermediate pressure compressor 414 compresses the air flow directed into it before delivering that air to the high pressure compressor 415 where further compression takes place.

The compressed air exhausted from the high-pressure compressor 415 is directed into the combustion equipment 416 where it is mixed with fuel and the mixture combusted. The resultant hot combustion products then expand through, and thereby drive the high, intermediate and low-pressure turbines 417, 418, 419 before being exhausted through the nozzle 420 to provide additional propulsive thrust. The high 417, intermediate 418 and low 419 pressure turbines drive respectively the high pressure compressor 415, intermediate pressure compressor 414 and fan 413, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

It will be understood that the invention is not limited to the embodiments above-described and various modifications and improvements can be made without departing from the scope of the invention as defined by the appended claims. Except where mutually exclusive, any of the features may be employed separately or in combination with any other features and the disclosure extends to and includes all combinations and sub-combinations of one or more features described herein.

The invention claimed is:

1. A gas turbine engine comprising;
   a fan mounted for rotation on a fan shaft having an axis of rotation X-X,
   a stub shaft coaxially arranged with the fan shaft, radially facing surfaces of the stub shaft and fan shaft engaging each other at an end adjacent the fan,
   a fan catcher assembly comprising one or more fan catcher arms extending from the stub shaft to a fan catcher ring located axially downstream of the fan,
   the stub-shaft connected to an upstream facing face of a bearing housing and the fan catcher ring having an upstream facing face opposing a downstream facing face of the bearing housing,
   the catcher arm and fan shaft extending through a central aperture of the bearing housing,
   wherein,
   in an extended region from a position upstream of an upstream facing face of the bearing housing to a position downstream of the upstream facing face of the bearing housing, a radial gap between the fan catcher arm and the fan shaft is consistently less than 5 mm.

2. A gas turbine engine as claimed in claim 1 wherein the extended region extends from the stub shaft.

3. A gas turbine engine as claimed in claim 1 wherein the extended region terminates at a downstream end at a position which is closer to the upstream facing face of the bearing housing than to the downstream facing face of the bearing housing.

4. A gas turbine engine as claimed in claim 1 wherein the radial gap is minimised such that, in the event of unbalance in the fan, the fan shaft and fan catcher arm deflect together as if a single body.

5. A gas turbine engine as claimed in claim 1 wherein the radial gap is 4mm or less.

6. A gas turbine engine as claimed in claim 1 wherein the radial gap is 3 mm or less.

7. A gas turbine engine as claimed in claim 1 wherein the radial gap is 2 mm or less.

8. A gas turbine engine as claimed in claim 1 wherein the radial gap is 1 mm or less.

9. A gas turbine engine as claimed in claim 1 wherein complementary contours are provided on opposed radially facing walls of the fan shaft and fan catcher arm in the extended region.

10. A gas turbine engine as claimed in claim 1 wherein the thickness of the fan shaft in a radial dimension is increased in the extended region compared to outside of the extended region.

* * * * *